(12) United States Patent
Kuroda et al.

(10) Patent No.: US 9,071,184 B2
(45) Date of Patent: Jun. 30, 2015

(54) MOTOR DRIVING SYSTEM

(71) Applicant: FUJI ELECTRIC CO., LTD., Kawasaki-shi (JP)

(72) Inventors: Takeshi Kuroda, Hino (JP); Akio Toba, Hino (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 197 days.

(21) Appl. No.: 13/943,003

(22) Filed: Jul. 16, 2013

(65) Prior Publication Data

US 2014/0055067 A1 Feb. 27, 2014

(30) Foreign Application Priority Data

Aug. 24, 2012 (JP) ................................. 2012-185102

(51) Int. Cl.
| | |
|---|---|
| H02P 6/00 | (2006.01) |
| H02P 23/00 | (2006.01) |
| H02P 29/02 | (2006.01) |
| H02P 6/18 | (2006.01) |

(52) U.S. Cl.
CPC .......... *H02P 23/0077* (2013.01); *H02P 29/022* (2013.01); *H02P 6/182* (2013.01)

(58) Field of Classification Search
CPC ......... H02P 6/08; H02P 6/182; H02P 23/077; H02P 29/022; H02P 6/18
USPC ........... 318/400.32, 615, 667, 599, 609, 610, 318/400.02; 324/160–180; 361/236–244
See application file for complete search history.

(56) References Cited

U.S. PATENT DOCUMENTS

| | | | | |
|---|---|---|---|---|
| 7,026,772 | B2 * | 4/2006 | Quirion | 318/400.02 |
| 7,057,362 | B2 * | 6/2006 | Norman | 318/400.2 |
| 8,055,399 | B2 * | 11/2011 | Wyatt et al. | 701/22 |
| 8,115,428 | B2 * | 2/2012 | Williams et al. | 318/400.02 |
| 8,296,003 | B2 * | 10/2012 | Wyatt et al. | 701/22 |
| 2005/0151502 | A1 * | 7/2005 | Quirion | 318/715 |
| 2009/0224707 | A1 * | 9/2009 | Williams et al. | 318/400.02 |

FOREIGN PATENT DOCUMENTS

| | | |
|---|---|---|
| JP | 2001-112282 A | 4/2001 |
| JP | 2007-209105 A | 8/2007 |

* cited by examiner

*Primary Examiner* — Rita Leykin
(74) *Attorney, Agent, or Firm* — Rabin & Berdo, P.C.

(57) ABSTRACT

A motor driving system is disclosed having a control device 4A for controlling a synchronous motor 1, the control device 4A comprising a sensorless control algorithm device 20 that includes an abnormality determining device 25 for determining abnormality of the algorithm based on a magnetic pole position error estimated value of the motor 1. When the abnormality determining device 25 has determined abnormality of the algorithm, the control device 4A controls a power converter 2 using a magnetic pole position detected value detected by a magnetic pole position detector 30 attached to the motor, in place of using a magnetic pole position estimated value. This motor driving system can guarantee reliability of the sensorless control algorithm device 20 while assuring safety. Safety of electric vehicles is enhanced by installing the motor driving system that has been guaranteed reliable.

16 Claims, 11 Drawing Sheets

MOTOR DRIVING SYSTEM

CROSS-REFERENCE TO RELATED APPLICATION

This application is based on, and claims priority to, Japanese Patent Application No. 2012-185102, filed on Aug. 24, 2012, contents of which are incorporated herein by reference.

BACKGROUND OF THE INVENTION

1. Field of the Invention

The present invention relates to a motor driving system that employs either an estimated value of a magnetic pole position or a detected value of a magnetic pole position corresponding to a normal or abnormal condition in sensorless control of the motor driving system. The invention also relates to an electric vehicle provided with such a motor driving system.

2. Description of the Related Art

In order to reduce a size and a cost of a driving system for a synchronous motor, a drive control method so-called sensorless control method has been proposed that does not employ a magnetic pole position detecting device to detect the magnetic pole position of a rotor.

The sensorless control, as is well known, executes estimation operation of the magnetic pole position of a rotor from the information on the terminal voltage and the armature current of the motor, and performs torque control and speed control of the motor by controlling current based on the estimated magnetic pole position.

Known traditional technologies for a motor driving system employing the sensorless control method are disclosed in Japanese Unexamined Patent Application Publication No. 2001-112282 and Japanese Unexamined Patent Application Publication No. 2007-209105, for example.

Japanese Unexamined Patent Application Publication No. 2001-112282 (paragraphs [0007] and [0011], and FIG. 1, in particular) discloses a motor control device for driving a motor, comprising a magnetic pole position detecting sensor and a magnetic pole position estimating device that employs sensorless control. In normal operating conditions, the motor is driven based on the position value detected by the magnetic pole position detecting sensor, and if any failure has occurred in the magnetic pole position detecting sensor, the control is changed over to execution based on the position value estimated by the magnetic pole position estimating device.

Japanese Unexamined Patent Application Publication No. 2007-209105 (Paragraphs [0013] through [0020], and FIGS. 1 and 2, in particular) discloses an electric vehicle driving device that compares a detected value of a magnetic pole position from a magnetic pole position detector and an estimated value of the magnetic pole position by a sensorless controller. If the difference between the detected value and the estimated value exceeds a predetermined value, some failure in the magnetic pole position detector is determined.

In the conventional technology disclosed in Japanese Unexamined Patent Application Publication No. 2001-112282, although the information on the magnetic pole position is doubled improving reliability, the provision of the magnetic pole position detector, an abnormality detecting device, and the magnetic pole position estimating device enlarges the system and raises the costs.

In the conventional technology disclosed in Japanese Unexamined Patent Application Publication No. 2007-209105, the abnormality of the magnetic pole position detector is determined based on the assumption that the magnetic pole position value estimated by the sensorless controller is correct. As a consequence, if the sensorless control itself becomes unstable, the accuracy of magnetic pole position estimation deteriorates, which leads to erroneous determination of abnormality of the magnetic pole position detector, and even run-away of the motor may occur.

A motor driving system having a sensorless control algorithm and without a magnetic pole position detector should be smaller and cheaper than a traditional driving system using a magnetic pole position detector. Such a motor driving system without a magnetic pole position detector has an additional advantage that the failure rate of the overall system is reduced because of elimination of problems due to vibration, heating, or noise.

If the reliability of the sensorless control is not guaranteed, however, a driving system depending on the sensorless control cannot be employed without hesitation for such an application as electric vehicles that require absolute safety.

SUMMARY OF THE INVENTION

It is therefore an object of the present invention to provide a motor driving system that can be guaranteed reliable and employs a sensorless control algorithm while ensuring safety. Another object of the invention is to provide an electric vehicle exhibiting high degree of safety by installing such a motor driving system that has been guaranteed reliable therein.

To accomplish the above object, an aspect of the present invention is a motor driving system for controlling a torque or a velocity of a synchronous motor by converting a DC power from a DC power supply into an AC power through a power converter and delivering the AC power to the motor, the motor driving system having a control device for controlling the power converter, the control device comprising a sensorless control algorithm that generates a magnetic pole position estimated value of the motor used for controlling the power converter in a normal state of the sensorless control algorithm, wherein the sensorless control algorithm comprises a first abnormality determining means and when the first abnormality determining means determines abnormality in the sensorless control algorithm, the control device controls the power converter using a magnetic pole position detected value from a magnetic pole position detecting means attached to the motor in place of using the magnetic pole position estimated value.

When the sensorless control operation becomes unstable due to any reason, a motor driving system of this aspect of the invention allows the motor operation being continued by changing-over to control based on normal magnetic pole position information provided by the magnetic pole position detecting means. Thus, a motor driving system of the invention prevents the motor from running out of control such as abrupt acceleration or deceleration and enables verification tests of the sensorless control under a sufficiently stable condition.

Preferably, the first abnormality determining means determines abnormality of the sensorless control algorithm based on a magnetic pole position error estimated value obtained by executing operation using at least armature current detected value of the motor.

Preferably in particular, the first abnormality determining means determines abnormality of the sensorless control algorithm according to the magnetic pole position error estimated value that has exceeded a predetermined angle.

In these aspects of the invention, determining abnormality can be performed without using the information from the magnetic pole position detecting means but executing operation of magnetic pole position error estimated value based on magnetic pole position information extracted from the armature current for use in sensorless control. Thus, abnormality in the sensorless control itself, if any, can be detected. The abnormality of the sensorless control algorithm can be determined separately from the abnormality of the magnetic pole position detecting means. Consequently, uncontrolled running of the motor due to erroneous determination as in Japanese Unexamined Patent Application Publication No. 2007-209105 is avoided and safety is assured by changing-over to the control based on normal information on the magnetic pole position provided by the magnetic pole position detecting means.

Preferably, the control device comprises a first alarm generating means that generates an alarm signal when the first abnormality determining means determines abnormality in the sensorless control algorithm.

This aspect of the invention allows the operator to recognize the abnormality of the sensorless control algorithm. As a consequence, the operator can control by handling according to the operator's own intension based on the magnetic pole position detected value, thereby stopping the motor driving system with safety.

Preferably, the control device comprises a data storage means that stores information of the sensorless control algorithm during a predetermined period of time before and after occurrence of abnormality in the sensorless control algorithm. The information of the sensorless control algorithm preferably includes, input data and output data into and out of the sensorless control algorithm. The data can specifically be armature current detected values of the motor, voltage command values, and magnetic pole position estimated value.

These data can be used for analysis of reason for abnormality in the sensorless control algorithm, contributing improvement of reliability of the sensorless control.

Preferably, the control device comprises a second abnormality determining means for determining abnormality in the magnetic pole position detecting means and, if the second abnormality determining means determines abnormality in the magnetic pole position detecting means during control operation of the power converter according to the magnetic pole position estimated value generated by the sensorless control algorithm, the control operation of the power converter is continued according to the magnetic pole position estimated value. This aspect of the invention allows the motor driving system to continue its operation even though any abnormality occurs in the magnetic pole position detecting means during testing of the sensorless control algorithm, thereby avoiding abrupt stop of the motor and enhancing safety.

Preferably, the control device comprises a second alarm generating device for generating an alarm signal using an output of the second abnormality determining means. This aspect of the invention gives a warning to the operator about abnormality in the magnetic position detecting means.

Preferably, a motor driving system without a magnetic pole position detecting means can be constructed, wherein reliability of the sensorless control algorithm has been guaranteed through normality determination by means of the motor driving system. This aspect of the invention provides a motor driving system with a small overall size, a low manufacturing cost, and a reduced failure rate. These characteristics are best fits to application to electric vehicles.

A motor driving system of the present invention certifies reliability of the sensorless control algorithm with the first abnormality determining means provided in the control device. A motor driving system equipped with a sensorless control algorithm that has been guaranteed reliable performs a smaller size, a lower price, and a reduced failure rate than a driving system having a magnetic pole position detecting means. A motor driving system of the invention also contributes to improving safety of an electric vehicle provided with such a driving system.

DETAILED DESCRIPTION OF THE INVENTION

The following describes some preferred embodiments of the present invention with reference to the accompanying drawings. The embodiments described in the following are motor driving systems that are applied to control the torque of a permanent magnet synchronous motor.

First described is sensorless control of a permanent magnet synchronous motor.

Figure 1:
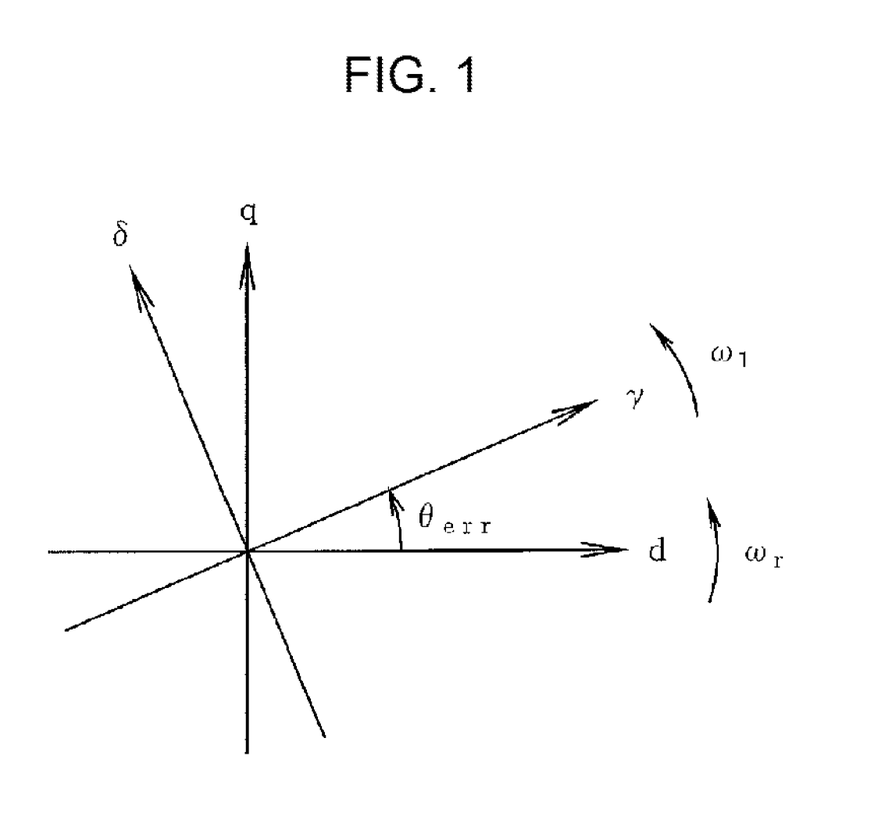
FIG. 1 defines d- and q-axes as well as γ- and δ-axes.

So-called sensorless control, being unable to directly identify a magnetic pole position of a rotor on d-axis and q-axis coordinates, uses an estimating rotating γ-axis and δ-axis coordinates instead, to control the torque and speed of the synchronous motor. FIG. 1 defines the d-axis and q axis as well as the γ-axis and δ-axis. The d-axis is the axis in the direction of N-pole of the rotor of the permanent magnet synchronous motor; the q-axis is the axis in advance by 90 degrees from the d-axis; the γ-axis is an estimated axis corresponding to the d-axis; and the δ-axis is the axis in advance by 90 degrees from the γ-axis.

Figure 2:
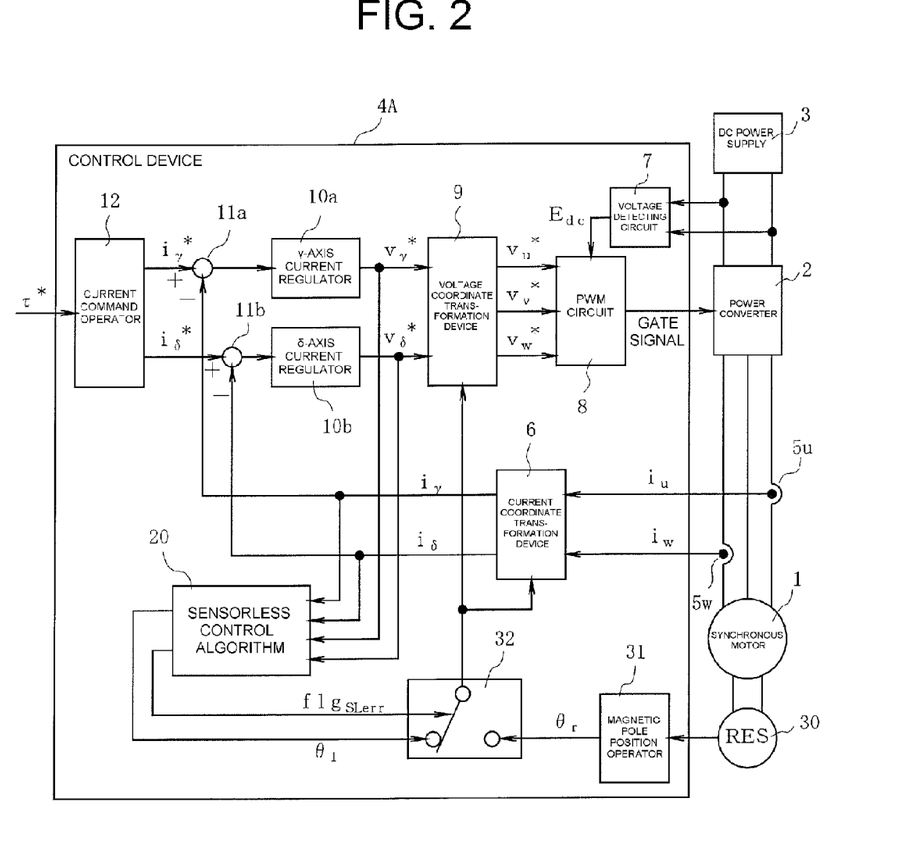
FIG. 2 shows an example of structure of a motor driving system according to a first embodiment of the present invention.

In FIG. 1, $\omega_r$ designates an electric angular velocity of the d-axis and the q axis; $\omega_1$ is an electric angular velocity of the γ-axis and the δ-axis, which is an estimated velocity; and $\theta_{err}$ designates the angle of the γ-axis with respect to the d-axis and, at the same time, the angle of the δ-axis with respect to the q-axis. The $\theta_{err}$ is represented by Mathematical Formula 1 below.

$$\theta_{err} = \theta_1 - \theta_r,$$ [Mathematical Formula 1]

where $\theta_1$ and $\theta_r$ are angles of γ-axis and d-axis, respectively,

FIG. 2 shows a structure of a motor driving system according to a first embodiment of the present invention. The motor driving system of FIG. 2 is composed of a main circuit and a control device 4A. The main circuit comprises a permanent magnet synchronous motor 1, a power converter 2 such as an inverter, a DC power supply 3, and a magnetic pole position detector 30 (a magnetic pole position detecting means) that is additionally provided to guarantee reliability of sensorless control. The control device 4A comprises a sensorless control algorithm device 20, which is a feature of the present invention.

The following describes the structure and operation of the control device 4A.

In the control device 4A in FIG. 2, a current command operator 12 executes operation of γ-axis and δ-axis current command values $i_\gamma^*$ and $i_\delta^*$ for controlling an output torque of the motor 1 to a torque command value τ*. A u-phase current detector 5u and a w-phase current detector 5w deliver a u-phase current detected value $i_u$ and a w-phase current detected value $i_w$, which then are given to a current coordinate transformation device 6. The current coordinate transformation device 6 executes coordinate transformation from the detected current values $i_u$ and $i_w$ to γ-axis and δ-axis detected current values $i_\gamma$ and $i_\delta$ using an estimated value of a magnetic pole position $\theta_1$ or a detected value of a magnetic pole position $\theta_r$.

The deviation of the γ-axis current command value $i_\gamma^*$ delivered by the current command operator 12 from the γ-axis current detected value $i_\gamma$ is obtained in a subtractor 11a. This deviation is given to a γ-axis current regulator 10a, which amplifies the deviation and executes operation to give a γ-axis voltage command value $v_\gamma^*$. In the same way, the deviation of the δ-axis current command value $i_\delta^*$ from the δ-axis current detected value $i_\delta$ is obtained in a subtractor 11b. This deviation is given to a δ-axis current regulator 10b, which amplifies the deviation and executes operation to give a δ-axis voltage command value $v_\delta^*$. The γ-axis and δ-axis voltage command values $v_\gamma^*$ and $v_\delta^*$ are transformed to phase voltage command values $v_u^*$, $v_v^*$, and $v_w^*$ in a voltage coordinate transformation device 9 using the magnetic pole position estimated value $\theta_1$ or the magnetic pole position detected value $\theta_r$.

A voltage detecting circuit 7 detects a DC voltage $E_{dc}$ supplied by the DC power supply 3 to the power converter 2. A PWM circuit 8 generates gate signals to control the output voltage of the power converter 2 to be the phase voltage command values $v_u^*$, $v_v^*$, and $v_w^*$ according to the phase voltage command values $v_u^*$, $v_v^*$, and $v_w^*$, and the detected DC voltage $E_{dc}$. The power converter 2 controls operation of semiconductor elements such as IGBTs provided in the power converter 2 according to the gate signals to obtain the terminal voltages of the motor 1 that equal the phase voltage command values $v_u^*$, $v_v^*$, and $v_w^*$ thereby achieving an output torque of the motor 1 that equals the torque command value τ*.

The output signal of the magnetic pole position detector 30 is delivered to a magnetic pole position operator 31. The magnetic pole position operator 31 executes operation of a magnetic pole position detected value $\theta_r$, which is given to an input terminal of a change-over switching means 32. The other input terminal of the change-over switching means 32 receives a magnetic pole position estimated value $\theta_1$ that is generated in the sensorless control algorithm device 20.

The change-over switching means 32 selects either the magnetic pole position estimated value $\theta_1$ or the magnetic pole position detected value $\theta_r$ corresponding to a flag $flg_{SLerr}$ delivered by the sensorless control algorithm device 20 and delivers the selected magnetic pole position value to the current coordinate transformation device 6 and the voltage coordinate transformation device 9.

The sensorless control algorithm device 20 having a structure described below generates the magnetic pole position estimated value $\theta_1$ and the flag $flg_{SLerr}$ based on the γ-axis and δ-axis voltage command values $v_\gamma^*$ and $v_\delta^*$ and the γ-axis and δ-axis current detected values $i_\gamma$ and $i_\delta$.

Figure 3:
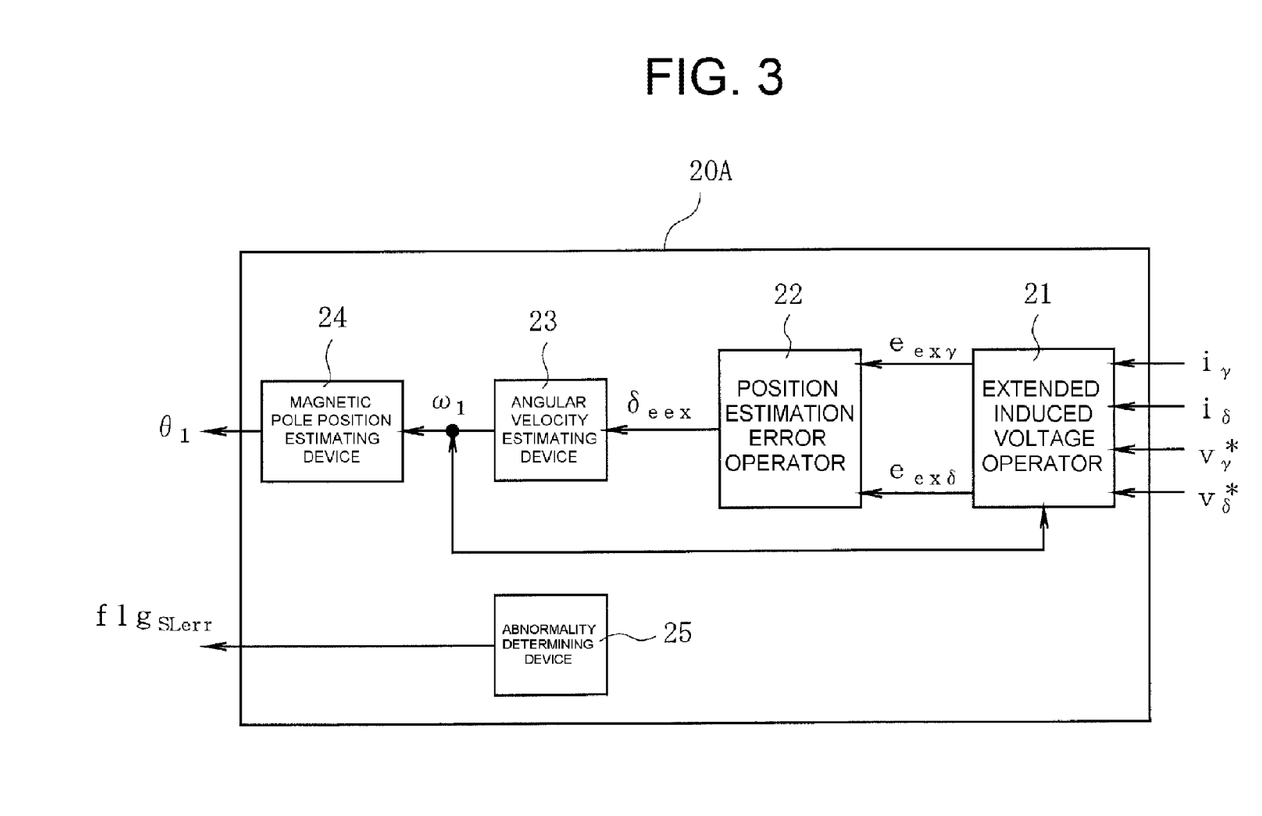
FIG. 3 shows a first example of a sensorless control algorithm in the motor control system of FIG. 2.

FIG. 3 shows a first example of the sensorless control algorithm device 20 that uses extended induced voltage in sensorless control. The specific example of sensorless control algorithm of FIG. 3 is designated by a symbol 20A.

Referring to FIG. 3, the sensorless control algorithm 20A comprises an extended induced voltage operator 21, a position estimation error operator 22, a velocity estimating device 23, a magnetic pole position estimating device 24, and an abnormality determining device 25.

The extended induced voltage operator 21 executes operation of extended induced voltages $\theta_{ex\gamma}$ and $\theta_{ex\delta}$ as shown by the Mathematical Formula 2 below based on the γ-axis and δ-axis voltage command values $v_\gamma^*$ and $v_\delta^*$, the γ-axis and δ-axis current detected values $i_\gamma$ and $i_\delta$, an angular velocity estimated value $\omega_1$, and motor parameters.

Mathematical Formula 2
$$\begin{bmatrix} e_{ex\gamma} \\ e_{ex\delta} \end{bmatrix} = \begin{bmatrix} v_\gamma^* \\ v_\delta^* \end{bmatrix} - \begin{bmatrix} r_a + pL_d & -\omega_1 L_q \\ \omega_1 L_q & r_a + pL_d \end{bmatrix} \begin{bmatrix} i_\gamma \\ i_\delta \end{bmatrix}$$

$e_{ex\gamma}$: γ-axis extended induced voltage
$e_{ex\delta}$: δ-axis extended induced voltage
$v_\gamma^*$: γ-axis voltage command value
$v_\delta^*$: δ-axis voltage command value
$i_\gamma$: γ-axis current detected value
$i_\delta$: δ-axis current detected value
$L_d$: d-axis inductance
$L_q$: q-axis inductance
$\omega_1$: angular velocity estimated value
$r_a$: armature resistsance
p: differentiation operator The position estimation error operator 22 executes operation of a magnetic pole position error estimated value (hereinafter referred to simply as position error estimated value) $\delta_{eex}$ from the γ-axis extended induced voltage $\theta_{ex\gamma}$ and the δ-axis extended induced voltage $\theta_{ex\delta}$ according to Mathematical Formula 3 below.

$$\delta_{eex} = \tan^{-1}(-e_{ex\gamma}/e_{ex\delta})$$ [Mathematical Formula 3]

The angular velocity estimating device 23 is composed of a PI regulator and executes operation of an angular velocity estimated value ω1 by amplifying the position error estimated value $\delta_{eex}$ according to Mathematical Formula 4 below.

$$\omega 1 = (K_P + K_I/s)\delta_{eex}$$ [Mathematical Formula 4]

where $K_p$ is a proportional gain, $K_I$ is an integral gain, and s is a Laplace operator.

The magnetic pole position estimating device 24 executes operation of the magnetic pole position estimated value $\theta_1$ by integrating the angular velocity estimated value $\omega_1$ according to Mathematical Formula 5 below.

$$\theta_1 = \int \omega_1 dt$$ [Mathematical Formula 5]

The abnormality determining device 25, as shown by Mathematical Formula 6 below, sets a flag $flg_{SLerr}$ to "1" when the sensorless control algorithm 20A becomes abnormal due to a certain event, and sets a flag $flg_{SLerr}$ to "0" when the sensorless control algorithm 20A is in a normal state.

$flg_{SLerr} = 0$ in a normal state of the sensorless control $flg_{SLerr}=1$ in a abnormal state of the sensorless control algorithm [Mathematical Formula 6]

Returning back to FIG. 2, the change-over switching means 32 selects the magnetic pole position estimated value $\theta_1$ delivered by the magnetic pole position estimating device 24 in the sensorless algorithm 20A when the flag $flg_{SLerr}$ is "0", and selects the magnetic pole position detected value $\theta_r$ delivered by the magnetic pole position operator 31 when the flag $flg_{SLerr}$ is "1".

This selection means that in an abnormal state of the sensorless control algorithm 20A, the magnetic pole position for use in the current coordinate transformation device 6 and the voltage coordinate transformation device 9 is changed over from the magnetic pole position estimated value $\theta_1$ to the magnetic pole position detected value $\theta_r$. Thus, the torque control of the motor 1 continues without interruption.

Figure 4:
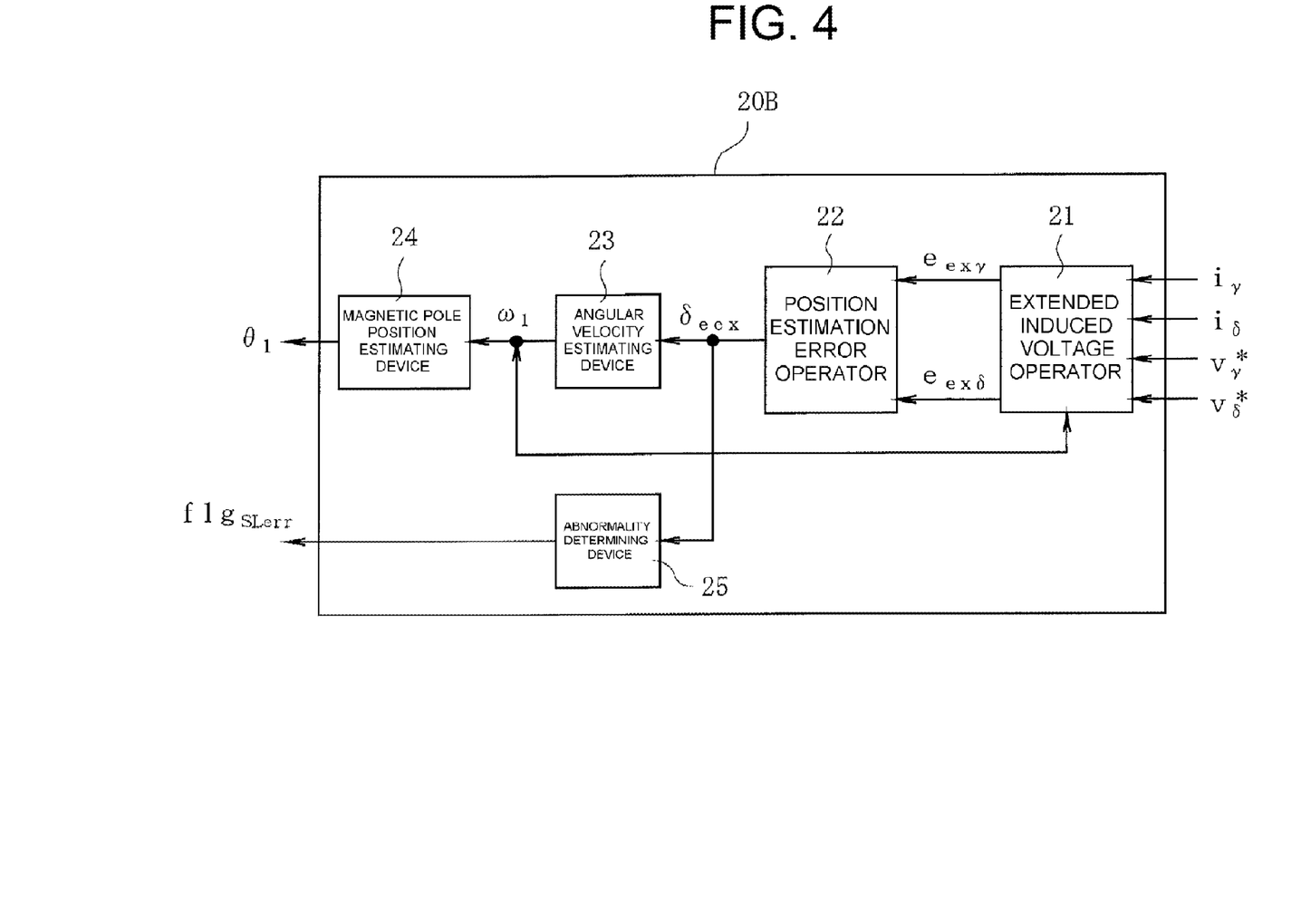
FIG. 4 shows a second example of a sensorless control algorithm in the motor control system of FIG. 2.

FIG. 4 shows a second example of the sensorless control algorithm. This specific example of sensorless control algorithm of FIG. 4 is designated by a reference symbol 20B.

The sensorless control algorithm 20B carries out abnormality determination in the abnormality determining device 25 using the Mathematical Formulas 2 and 3, which give position error estimated value $\delta_{eex}$ based on the γ-axis current detected value $i_\gamma$ and the δ-axis current detected value $i_\delta$. The sensorless control algorithm 20B carries out abnormality determination according to this position error estimated value $\delta_{eex}$ and sets the flag $flg_{SLerr}$.

The position error estimated value $\delta_{eex}$ is an estimated angular difference between the d-axis of the motor and the estimated γ-axis. Thus, the determination of abnormality in sensorless control is performed solely based on the input information to the sensorless control algorithm 20B without using the information from the magnetic pole position detector 30.

A specific example of abnormality determination in the abnormality determination device 25 is as follows. As shown by Mathematical Formula 7 below, the sensorless control algorithm 20B determines abnormality and sets the $flg_{SLerr}$ to the value "1" when the absolute value of the position error estimated value δeex exceeds a predetermined angle $\theta_{errmax}$.

$flg_{SLerr}=0$ for $|\delta_{eex}|\le\theta_{errmax}$.

$flg_{SLerr}=1$ for $|\delta_{eex}|>\theta_{errmax}$. [Mathematical Formula 7]

Figure 5:
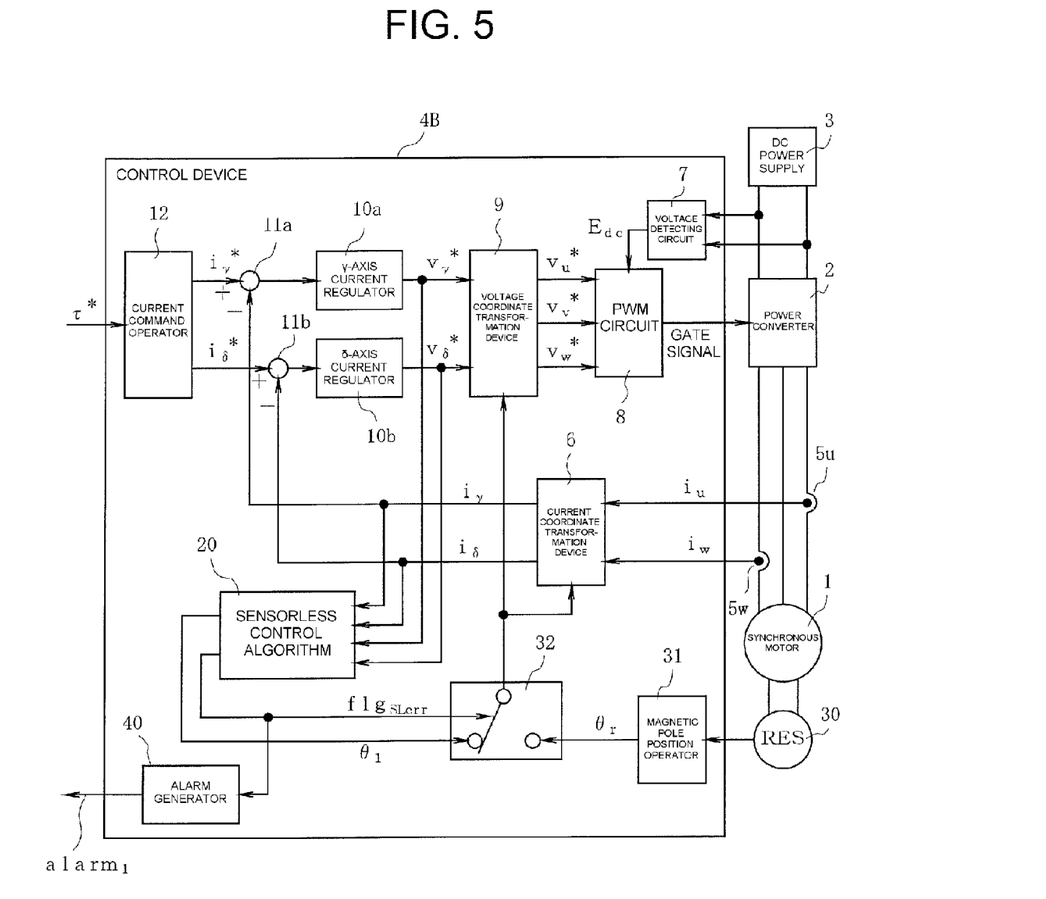
FIG. 5 shows an example of structure of a motor driving system according to a second embodiment of the present invention.

FIG. 5 shows an example of structure of a motor driving system according to a second embodiment of the present invention.

A control device 4B of the motor driving system according to the second embodiment has an alarm generator 40 added to the control device 4A shown in FIG. 2. The alarm generator 40 generates a first alarm alarm1 when the sensorless control algorithm device 20 becomes abnormal setting the $flg_{SLerr}$ to the value "1". The alarm1 can be a warning sound or a warning light giving a caution to the operator.

Noticing the alarm, the operator recognizes that the sensorless control algorithm has become abnormal and that the magnetic pole position for use in the current coordinate transformation device 6 and the voltage coordinate transformation device 9 has changed over from the magnetic pole position estimated value $\theta_1$ to the magnetic pole position detected value $\theta_r$. Thus, the operator can safely manually stop the motor driving system.

Figure 6:
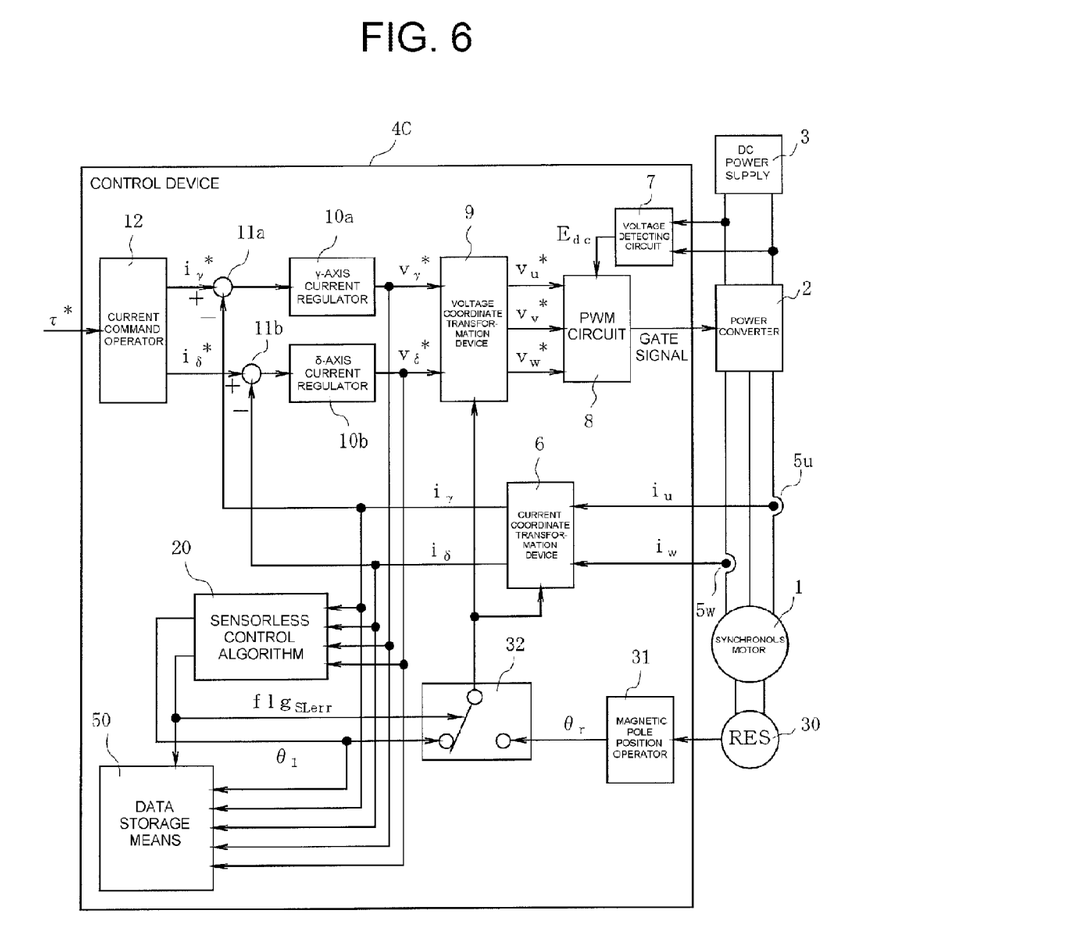
FIG. 6 shows an example of a structure of a motor driving system according to a third embodiment of the present invention.

FIG. 6 shows an example of structure of a motor driving system according to a third embodiment of the invention.

The control device 4C of the motor driving system according to the third embodiment has a data storage means 50 that is essentially composed of a memory. The date storage means 50 stores the input and output data of the sensorless control algorithm device 20, the data including $\theta_1$, $v_\gamma^*$, $v_\delta^*$, $i_\gamma$, and $i_\delta$ in the example of FIG. 6, during a specified period of time around the occurrence of abnormality in the sensorless control algorithm corresponding to the value of the flag $flg_{SLerr}$.

Figure 7:
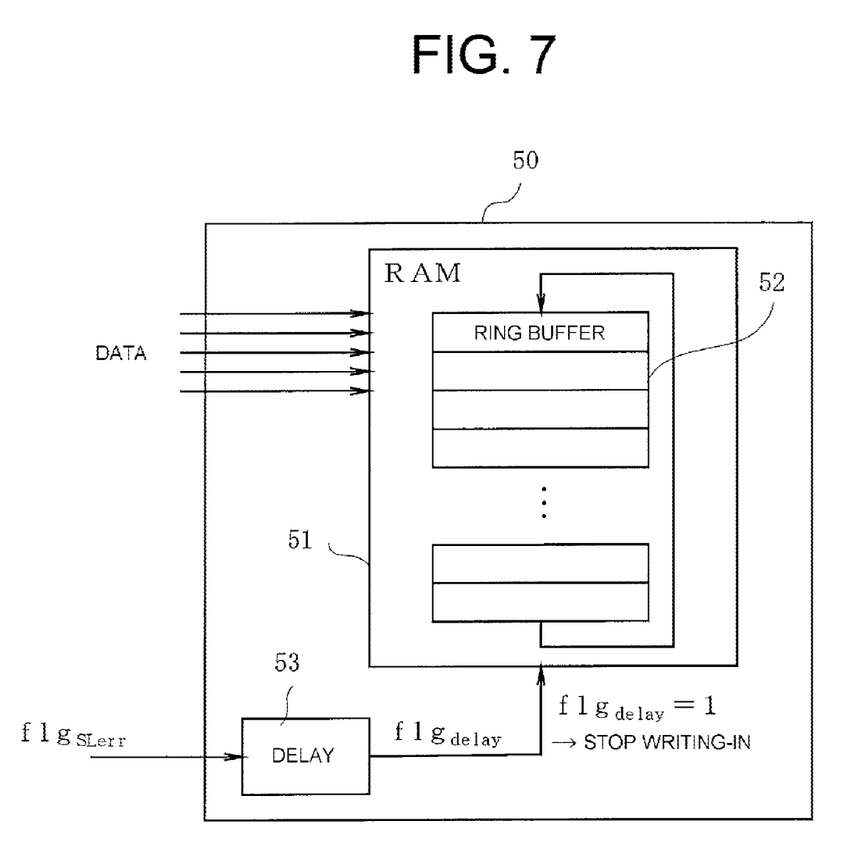
FIG. 7 shows an example of a structure of the data storage means in the motor driving system of FIG. 6.

The data storage means 50, as shown in FIG. 7, comprises a ring buffer 52 that is composed using a memory 51 in a random access memory (RAM) or static RAM (SRAM) within a CPU and is capable of storing data during a certain period of time. The data storage means 50 also has a delay element 53.

In a normal state of the sensorless control algorithm device 20, in which $flg_{SLerr}$="0", data are written in real time sequentially from the top address of the ring buffer 52. When all the addresses of the ring buffer 52 are filled with written data, the address retunes to the top address and the next data is overwritten on the address. If some abnormality occurs in the sensorless control algorithm device 20, in which $flg_{SLerr}$="1", the delay element 53 delays the flag $flg_{SLerr}$ by a predetermined time to generate a signal $flg_{delay}$. When the signal $flg_{delay}$ becomes "1" after the predetermined time, the date storage means 50 stops data writing into the ring buffer 52.

Figure 8:
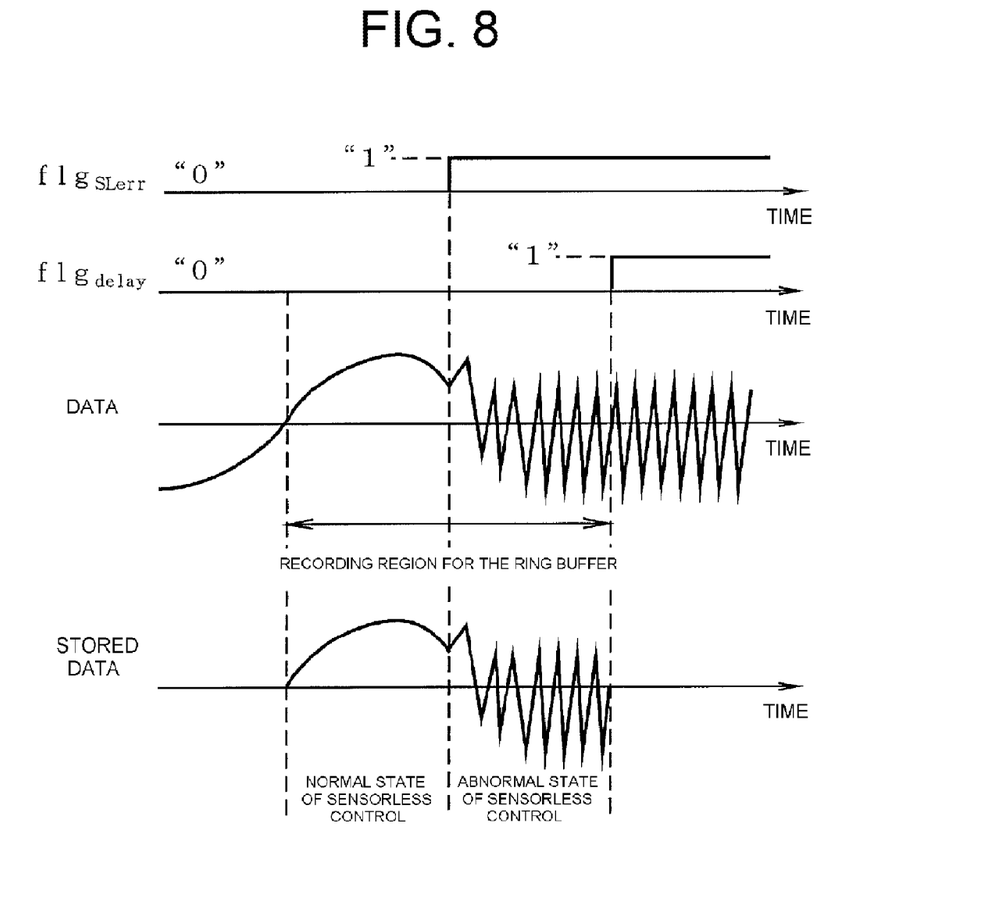
FIG. 8 is a time chart showing operation of the data storage means of FIG. 7.

Thus, the data storage means 50 stores data in the predetermined period of time before and after the occurrence of the abnormality in the sensorless control algorithm device 20 as illustrated in FIG. 8. The data in FIG. 8 is one of the input and output data $\theta_1$, $v_\gamma^*$, $v_\delta^*$, $i_\gamma$, and $i_\delta$ mentioned above in conceptual representation.

Figure 9:
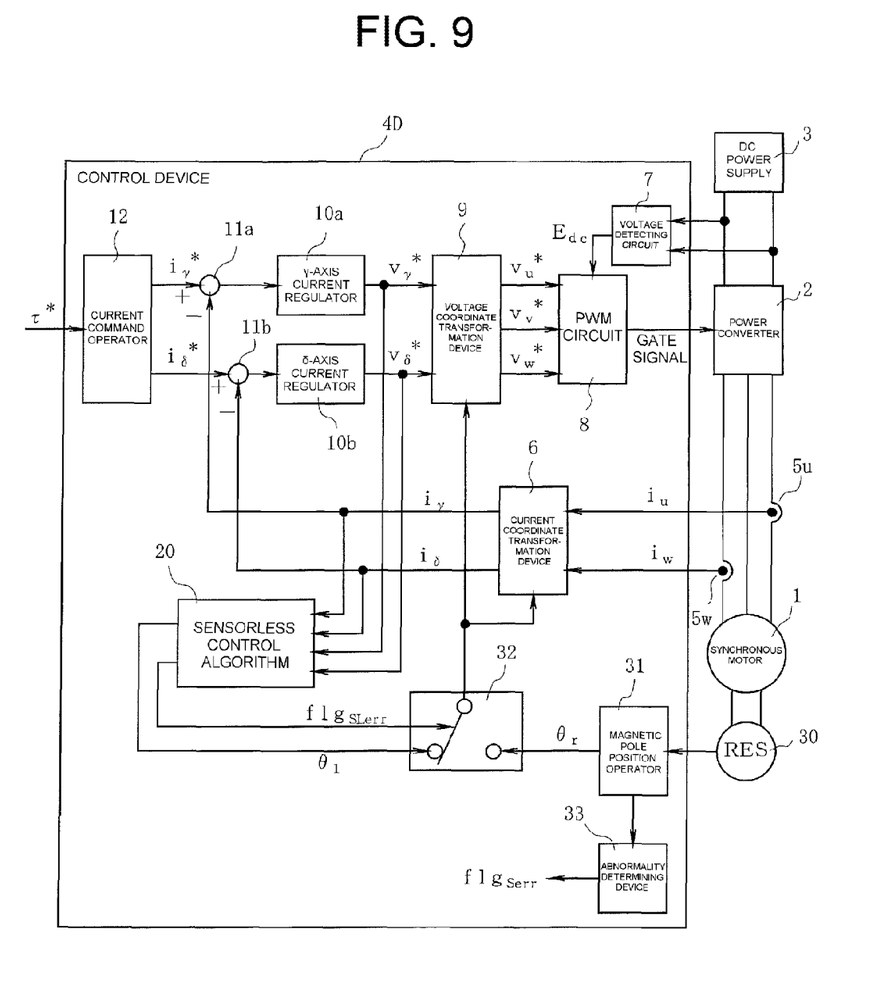
FIG. 9 shows an example of a structure of a motor driving system according to a fourth embodiment of the present invention.

FIG. 9 shows an example of structure of a motor driving system according to a fourth embodiment of the present invention.

A control device 4D of the motor driving system according to the fourth embodiment is provided, in addition to the control device 4A of FIG. 2, with a second abnormality determining device 33 for determining abnormality in the magnetic pole position detector 30, The second abnormality determining device 33 detects occurrence of abnormality, including breaking of a wire, in the magnetic pole position detector 30 through the magnetic pole position operator 31 and delivers a flag $flg_{Serr}$ as indicated in Mathematical Formula 8 below. The abnormality determining device 33 can take in directly the output signal of the magnetic pole position detector 30.

$flg_{Serr}$=0 for normal state of the magnetic pole position detector $flg_{Serr}$=1 for abnormal state of the magnetic pole position detector including wire breaking, for example. [Mathematical Formula 8]

Even though the magnetic pole position detector 30 is in an abnormal state, in which flag $flg_{Serr}$="1", the motor driving system of this fourth embodiment continues driving the motor 1 according to the flag $flg_{SLerr}$="0" from the sensorless control algorithm device 20 using the magnetic pole position estimated value $\theta_1$ based on the sensorless control. Thus, despite occurrence of any abnormality in the magnetic poles position detector 30 in operation of the motor driving system, the motor 1 does not stop abruptly, and instead, can be manually stopped safely according to the operator's intention.

Figure 10:
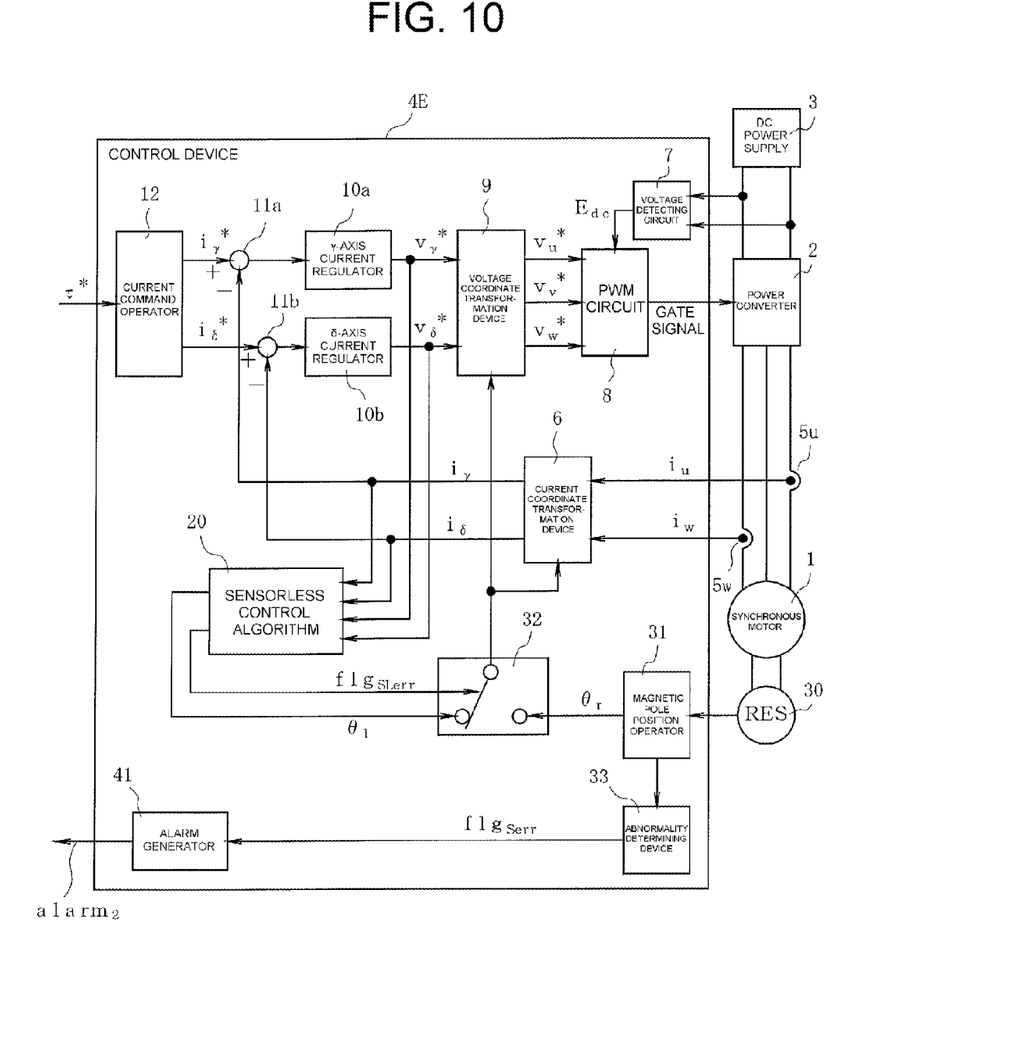
FIG. 10 shows an example of a structure of a motor driving system according to a fifth embodiment of the present invention.

FIG. 10 shows an example of structure of a motor driving system according to a fifth embodiment of the present invention.

A control device 4E of the motor driving system according to the fifth embodiment is provided, in addition to the control device 4D shown in FIG. 9, with a second alarm generator 41 at the next stage of the abnormality determining device 33. The second alarm generator 41 generates a second alarm alarm2 when the magnetic pole position detector 30 becomes abnormal setting the flg$_{Serr}$ to the value "1". The second alarm alarm2 can be a warning sound or a warning light giving a caution to the operator. Thus, the operator can recognize occurrence of some abnormality in the magnetic pole position detector 30 and manually stop the motor driving system safely.

Figure 11:
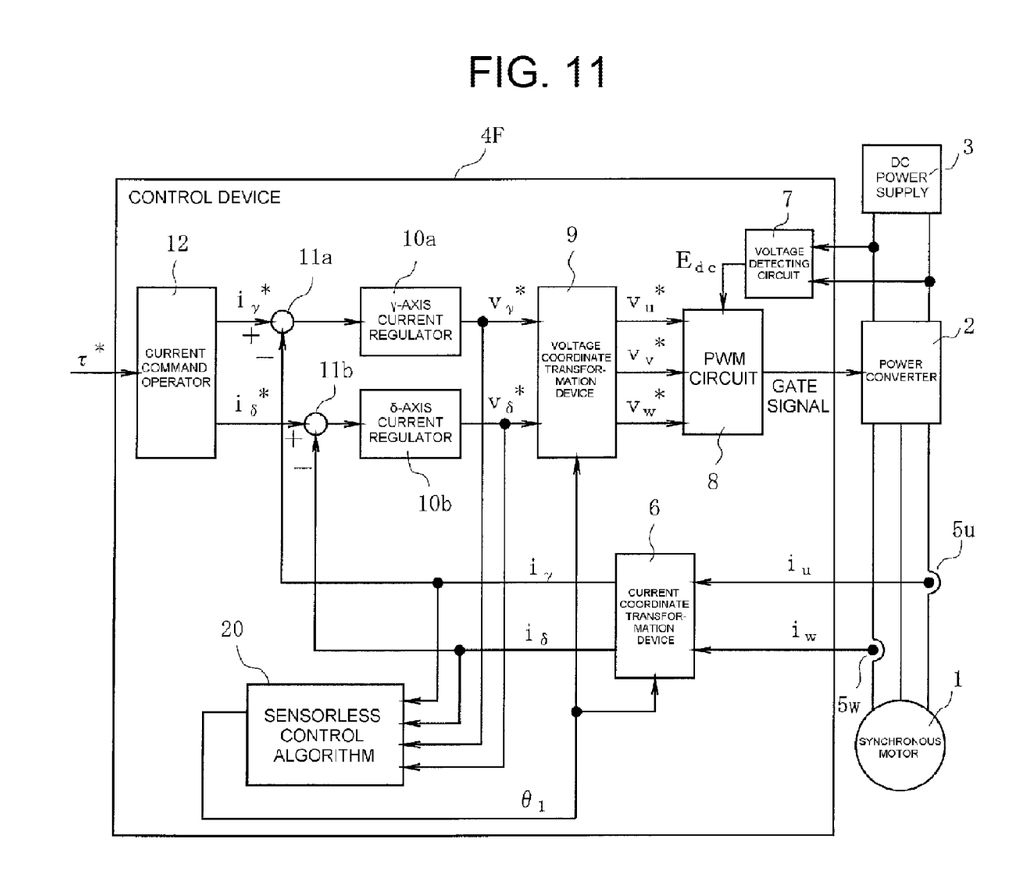
FIG. 11 shows an example of a structure of a motor driving system according to a sixth embodiment of the present invention.

FIG. 11 shows an example of structure of a motor driving system according to a sixth embodiment of the present invention.

In this sixth embodiment, at first, reliability of the sensorless control algorithm device 20 is guaranteed by means of one of the first through fifth embodiments. After notifying the flag flg$_{SLerr}$="0" and guaranteeing the normal state of the sensorless control algorithm device 20, a control device 4F as shown in FIG. 11 is constructed that does not have any one of: the magnetic pole position detector 30, the magnetic pole position operator 31, the change-over switching means 32, the alarm generators 40 and 41, the date storage means 50, the abnormality determining device 33, which are included in the motor driving systems according to the first through fifth embodiments. In FIG. 11, the same reference symbols to the components of the main circuit and the control device 4F are given as those in the first through fifth embodiments.

Because the reliability of the sensorless control algorithm has already been guaranteed in the motor driving system of the sixth embodiment that lacks the magnetic pole position detector 30 and related components, the motor 1 can be driven without reliance on the magnetic pole position detector 30, the system as a whole has a small size and can be manufactured at a low cost. Moreover, the failure rate is reduced because any failure of a magnetic pole position detector due to problems of such as vibration, heat and noise can be excluded from consideration.

This motor driving system according to the fifth embodiment is preferably installed in electric vehicles. In that case, the DC power supply 3 can be the onboard battery, and the torque command value τ* can be given to the current command operator 12 based on the stroke of the accelerator pedal or the brake pedal.

The motor driving system of the present invention can be applied to transportation including electric vehicles and a wide variety of other industrial devices and equipment.

Although the invention has been described with regard to specific embodiments, it may be practiced otherwise than as specifically described herein.

What is claimed is:

1. A motor driving system for controlling a synchronous motor, the motor driving system comprising:
a DC power supply;
a power converter converting a DC power from the DC power supply into an AC power through and delivering the AC power to the motor;
a control device for controlling the power converter;
a sensorless control algorithm device that generates a magnetic pole position estimated value of the motor;
a first abnormality determining means that determines abnormality in the sensorless control algorithm device;
a magnetic pole position detecting means attached to the motor;
wherein, in a normal state of the sensorless control algorithm device, the control device controls the power converter using the magnetic pole position estimated value, and
when the first abnormality determining means determines abnormality in the sensorless control algorithm device, the control device controls the power converter using the magnetic pole position detected value in place of using the magnetic pole position estimated value.

2. The motor driving system according to claim 1, wherein the first abnormality determining means determines abnormality of the sensorless control algorithm device based on a magnetic pole position error estimated value obtained by executing operation using at least an armature current detected value of the motor.

3. The motor driving system according to claim 2, wherein the first abnormality determining means determines abnormality of the sensorless control algorithm device when the magnetic pole position error estimated value exceeds a predetermined angle.

4. The motor driving system according to claim 1, wherein the control device comprises a first alarm generating means that generates an alarm signal when the first abnormality determining means determines abnormality in the sensorless control algorithm device.

5. The motor driving system according to claim 1, wherein the control device comprises a data storage means that stores information of the sensorless control algorithm device during a predetermined period of time before and after occurrence of abnormality in the sensorless control algorithm device.

6. The motor driving system according to claim 5, wherein the information includes input data and output data into and out of the sensorless control algorithm device.

7. The motor driving system according to claim 1, wherein
the control device comprises a second abnormality determining means for determining abnormality in the magnetic pole position detecting means and,
if the second abnormality determining means determines abnormality in the magnetic pole position detecting means during control operation of the power converter according to the magnetic pole position estimated value generated by the sensorless control algorithm, the control operation of the power converter is continued according to the magnetic pole position estimated value.

8. The motor driving system according to claim 7, wherein the control device comprises a second alarm generating device for generating an alarm signal using an output of the second abnormality determining means.

9. An electric vehicle driven by a synchronous motor, the motor controlled by a motor driving system comprising:
a DC power supply;
a power converter converting a DC power from the DC power supply into an AC power through and delivering the AC power to the motor;
a control device for controlling the power converter;
a sensorless control algorithm device that generates a magnetic pole position estimated value of the motor;
a first abnormality determining means that determines abnormality in the sensorless control algorithm device;
a magnetic pole position detecting means attached to the motor;
wherein, in a normal state of the sensorless control algorithm device, the control device controls the power converter using the magnetic pole position estimated value, and
when the first abnormality determining means determines abnormality in the sensorless control algorithm device, the control device controls the power converter using the magnetic pole position detected value in place of using the magnetic pole position estimated value.

10. The electric vehicle according to claim 9, wherein the first abnormality determining means determines abnormality of the sensorless control algorithm device based on a magnetic pole position error estimated value obtained by executing operation using at least an armature current detected value of the motor.

11. The electric vehicle according to claim 10, wherein the first abnormality determining means determines abnormality of the sensorless control algorithm device when the magnetic pole position error estimated value exceeds a predetermined angle.

12. The electric vehicle according to claim 9, wherein the control device comprises a first alarm generating means that generates an alarm signal when the first abnormality determining means determines abnormality in the sensorless control algorithm device.

13. The electric vehicle according to claim 9, wherein the control device comprises a data storage means that stores information of the sensorless control algorithm device during a predetermined period of time before and after occurrence of abnormality in the sensorless control algorithm device.

14. The electric vehicle according to claim 13, wherein the information includes input data and output data into and out of the sensorless control algorithm device.

15. The electric vehicle according to claim 9, wherein
the control device comprises a second abnormality determining means for determining abnormality in the magnetic pole position detecting means and,
if the second abnormality determining means determines abnormality in the magnetic pole position detecting means during control operation of the power converter according to the magnetic pole position estimated value generated by the sensorless control algorithm, the control operation of the power converter is continued according to the magnetic pole position estimated value.

16. The electric vehicle according to claim 15, wherein the control device comprises a second alarm generating device for generating an alarm signal using an output of the second abnormality determining means.

* * * * *